Patented Aug. 14, 1951

2,564,565

UNITED STATES PATENT OFFICE 2,564,565

PENICILLIN ALUMINUM ALKOXIDES

John B. Conn, Westfield, N. J., assignor to Merck & Co., Inc., Rahway, N. J., a corporation of New Jersey No Drawing. Application October 5, 1946, Serial No. 701,418

3 Claims. (Cl. 260—239.1)

This invention relates to non-hygroscopic physiologically active forms of penicillin which possess enhanced stability. More particularly, it pertains to penicillin salts and methods for their preparation.

It is an object of the present invention to provide a physiologically active penicillin compound which can be exposed to the atmosphere without absorption of moisture and the subsequent deterioration of the bactericidal action of the penicillin.

Regarded in certain of its broader aspects the process, according to the present invention, comprises reacting penicillin acid with an aluminum alcoholate in an organic solvent medium to form the corresponding alkoxylated aluminum penicillin. The reactions involved may be expressed in simplified form as follows:

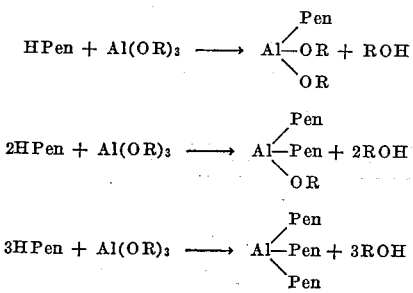

wherein Pen represents the penicillin $$(C_{16}H_{17}O_4N_2S)$$

and the structural formula:

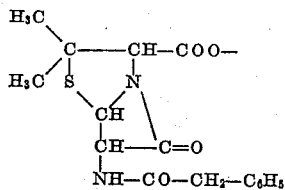

and R represents lower alkyl radicals having three or more carbon atoms.

It has also been found that the reaction of penicillin acid with an aluminum alcoholate in an aqueous organic solvent medium results in the precipitation of hydroxylated aluminum penicillin.

The reactions involved may be expressed as follows:

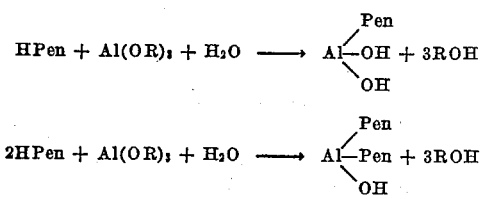

wherein Pen and R are as above.

Organic solvent solutions of penicillin acid to be treated by the process of the present invention may result from previous chemical operations in the preparation of penicillin or may be prepared by dissolving a salt of penicillin in water, acidifying and extracting the penicillin acid into an immiscible organic solvent.

Any organic solvent solution or mixture of solvents can be employed as the solvent medium for the salt formation in the practice of the present invention provided that the solvents do not act to destroy either of the reactants. Suitable solvents which can be used include ether, chloroform, amyl acetate, etc.

It has been found that aluminum derivatives of α-ethyl, propyl, butyl and higher alcohols are most suitable for use in the present invention because of their ready solubility in non-reactive organic solvents. Aluminum methoxide and β-ethoxide are too insoluble for convenient application.

The aluminum penicillin salts are amorphous solids, soluble in pyridine and glacial acetic acid, slightly soluble in chloroform and propylene glycol, but insoluble in water, ether, alcohol, benzene, acetone, dioxane, amyl acetate and carbon tetrachloride. They dissolve with decomposition in mineral acids and bases if a wetting agent is present. The hydroxylated aluminum penicillins are soluble only in glacial acetic acid and mineral acids and bases.

Hydroxylated aluminum penicillin is a dense glassy, amorphous solid, without any characteristic melting point. The composition varies with the purity of the clinical penicillin used as starting material.

In accordance with a preferred embodiment of this invention, an aqueous solution of sodium penicillin is diluted with an organic solvent such as ether, amyl acetate or chloroform. The mixture is cooled and stirred while sufficient hydrochloric acid is added to adjust the pH to about 2.0 to 2.5. This reaction and subsequent reactions are carried out at approximately 0° C. in order to prevent loss of potency of the penicillin during the reaction. The sodium penicillin is thus converted to penicillin acid and is extracted into the organic solvent layer. The immiscible liquids are separated and the aqueous layer extracted with additional chloroform to recover any active penicillin which might remain in this layer. The organic solvent extracts are combined and dried over calcium sulfate. An aluminum alcoholate is dissolved in an organic solvent solution. This solution should be acid-free and dry to prevent wastage of the alcoholate. The organic solvent solution of an aluminum alcoholate obtained is added to the organic solvent solution of penicillin acid and the alkoxylated penicillin precipitates almost immediately. The desired product is recovered, washed and dried.

It has also been found that reacting an organic solvent solution of penicillin acid with an organic solvent solution of an aluminum alcoholate in the presence of water results in the precipitation of hydroxylated penicillin.

In order to ascertain the loss of potency of various penicillin salts during storage, sodium penicillin, calcium penicillin and the aluminum penicillin complex salts were stored under comparative conditions. Sodium and calcium penicillin absorb moisture from the atmosphere and are consequently inactivated. It was therefore necessary to store these compounds in a desiccator. The aluminum salts are non-hygroscopic and are not effected by the moisture in the atmosphere. It was possible to expose the aluminum salts to the atmosphere without loss of activity. The samples were stored for 42 days at 50° C. and the potency tested at regular intervals. The results of this test are given below:

*Stability of penicillin salts*

|  | Days at 50° C. | | | | | Per Cent Loss | |
| --- | --- | --- | --- | --- | --- | --- | --- |
|  | 0 | 4 | 14 | 28 | 42 | After 14 days | After 42 days |
| POTENCY O. U./MG. | | | | | | | |
| Hydroxylated Aluminum Penicillin | 775 |  | 525 | 371 | 254 | 32 | 67 |
| Isopropoxylated Aluminum Penicillin | 1,280 |  | 1,040 | 888 | 973 | 19 | 24 |
| Do | 430 |  | 388 | 349 | 367 | 10 | 15 |
| Do | 294 |  | 321 | 304 | 309 | (¹) | (¹) |
| POTENCY (1000 UNITS) | | | | | | | |
| Sodium Penicillin | 104 | 82.5 | 39.6 |  |  | 62 |  |
| Do | 86.6 | 59.4 | 28.9 |  |  | 67 |  |
| Calcium Penicillin | 182 | 152 | 157 |  |  | 14 |  |

¹ None detectable.

The following examples illustrate a method of carrying out the present invention, but it is to be understood that these examples are given by way of illustration and not of limitation.

*Example 1*

About 50 cc. of chloroform is added to a solution of about 5 g. (500 Oxford units/mg.) of sodium penicillin dissolved in 50 cc. of water. The mixture is cooled in an ice bath and stirred while sufficient 2 N hydrochloric acid is added to adjust the pH of the solution to 2.0-2.5. The chloroform and water layers are separated and the water layer is extracted with an additional 25 cc. of chloroform.

The combined chloroform extracts are dried with 5 g. of anhydrous calcium sulfate for 15 minutes at 0° C. The desiccant is removed by filtration and the solution diluted to 200 cc. with dry ether.

The chloroform solution containing penicillin acid, is cooled in an ice bath and a solution of 5 g. of aluminum isopropoxide dissolved in 25 cc. of ether is added rapidly with vigorous stirring. The curdy precipitate which separates immediately is filtered, washed several times with dry ether and dried in vacuo at room temperature. The product, isopropoxylated aluminum penicillin, is a pale yellow amorphous solid which is odorless, tasteless, non-hygroscopic and insoluble in water and organic solvents. It dissolves slowly in dilute acids.

*Example 2*

About 50 cc. of amyl acetate is added to a solution of about 5 g. (500 Oxford units/mg.) of sodium penicillin dissolved in 50 cc. of water. The mixture is cooled in an ice bath and stirred while sufficient 2 N hydrochloric acid is added adjust the pH of the solution to 2.0 to 2.5. The amyl acetate and water layers are separated and the water layer is extracted with an additional 25 cc. of amyl acetate.

The combined amyl acetate extracts are dried with 5 g. of anhydrous sodium sulfate. The desiccant is removed by filtration and the solution diluted to 200 cc. with amyl acetate.

The 200 cc. amyl acetate solution, containing penicillin acid, is cooled in an ice bath and a solution of 10 g. of aluminum isopropoxide dissolved in 50 cc. of dry benzene is added rapidly with vigorous stirring. The voluminous yellow precipitate which separates immediately is filtered, washed with dry ether, dried, and rewashed with ether. The product obtained is the isopropoxylated aluminum penicillin.

*Example 3*

5 to 10 cc. of ether is added to a solution of about 1 g. (500 Oxford units/mg.) of sodium penicillin dissolved in 5 to 10 cc. of water. The mixture is cooled in an ice bath and stirred while sufficient 2 N hydrochloric acid is added to adjust the pH of the solution to 2.0 to 2.5. The ether and water layers are separated and the water layer is extracted with an additional 25 cc. of ether.

The combined ether extracts are dried with 5 g. of anhydrous calcium sulfate for 15 minutes at 0° C. The desiccant is removed by centrifugation and the solution diluted to 200 cc. with dry ether.

The ether solution, containing penicillin acid, is cooled in an ice bath and a solution of 0.6–1.2 g. of aluminum tertiary butoxide in 5 cc. of ether is added rapidly with vigorous stirring. The tertiary-butoxylated aluminum penicillin is precipitated immediately.

*Example 4*

About 50 cc. of chloroform is added to a solution of about 5 g. (500 Oxford units/mg.) of sodium penicillin dissolved in 50 cc. of water. The mixture is cooled in an ice bath and stirred while sufficient 2 N hydrochloric acid is added to adjust the pH of the solution to 2.0 to 2.5. The chloroform and water layers are separated and the water layer is extracted with an additional 25 cc. of chloroform.

The chloroform extract containing penicillin acid, is poured into 225 cc. of ordinary dioxane which contains water.

5 g. of aluminum isopropoxide in 25 cc. of benzene is added to the above solution. The mixture sets to a clear gel which cannot be filtered. It is separated and washed with ether by centrifugation and dried. The product obtained is hydroxylated aluminum penicillin, a dense glassy solid.

The foregoing description and examples are intended to be illustrative only. Any modification of, or variation therefrom, which conforms to the spirit of the invention is intended to be included within the scope of the claims.

I claim:

1. A compound of the formula

wherein Pen represents the penicillin radical

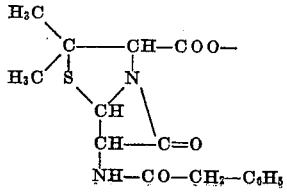

R is selected from the group consisting of isopropyl and tertiary butyl radicals, and X is selected from the group consisting of the radicals —Pen and —OR.

2. Aluminum penicillin di-isopropoxide.
3. Aluminum penicillin di-tertiary butoxide.

JOHN B. CONN.

REFERENCES CITED

The following references are of record in the file of this patent:

UNITED STATES PATENTS

| Number | Name | Date |
|---|---|---|
| 2,225,197 | Stagner | Dec. 17, 1940 |
| 2,449,039 | Libby | Sept. 7, 1948 |
| 2,459,315 | Goldberg et al. | Jan. 18, 1949 |
| 2,461,949 | Wintersteiner et al. | Feb. 15, 1949 |
| 2,487,668 | Pasternack | Nov. 9, 1949 |
| 2,497,769 | Hansen et al. | Feb. 14, 1950 |
| 2,530,372 | Bohls | Nov. 21, 1950 |

OTHER REFERENCES

Pfizer Reports (I), V, Miscellaneous, page 24, January 2, 1944.

Science, June 15, 1945, pages 618–619.

J. Amer. Med. Assoc., July 21, 1945, pages 845–846.

Barach et al.: "Science," vol. 102, September 7, 1945, pages 247 to 251.

Abraham et al.: "The British Journal of Experimental Pathology," vol. 23, June 1942, pages 106–107.